United States Patent
Huang et al.

(10) Patent No.: US 8,415,851 B2
(45) Date of Patent: Apr. 9, 2013

(54) TERMINAL ELEMENT, MOTOR WINDING STRUCTURE AND METHOD FOR MANUFACTURING MOTOR WINDING STRUCTURE

(75) Inventors: Wen-Shi Huang, Taoyuan Hsien (TW); Chin-Chu Hsu, Taoyuan Hsien (TW); Chun-Hua Yang, Taoyuan Hsien (TW); Chia-Ying Hsu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 524 days.

(21) Appl. No.: 12/702,746

(22) Filed: Feb. 9, 2010

(65) Prior Publication Data
US 2010/0201218 A1   Aug. 12, 2010

Related U.S. Application Data

(63) Continuation-in-part of application No. 12/109,981, filed on Apr. 25, 2008, now abandoned.

(30) Foreign Application Priority Data

Sep. 21, 2007 (TW) ............................... 96135409 A (51) Int. Cl.
*H02K 3/00* (2006.01)
*H02K 11/00* (2006.01)
*H01F 27/38* (2006.01)
*H01F 27/30* (2006.01)
*H01F 7/06* (2006.01)

(52) U.S. Cl.
USPC ............. 310/194; 310/71; 336/195; 336/196; 29/605

(58) Field of Classification Search ............... 310/71, 310/194; 336/92, 100, 194–196; 29/605
See application file for complete search history.

(56) References Cited

U.S. PATENT DOCUMENTS

| 3,663,914 A | * | 5/1972 | Lane ............................. 336/192 |
| 5,001,379 A |   | 3/1991 | Katayama |
| 5,264,816 A | * | 11/1993 | Degenhart et al. ............ 336/192 |
| 5,502,429 A | * | 3/1996 | De Jong et al. ................ 336/192 |

FOREIGN PATENT DOCUMENTS

| JP | 11069690 A | * | 3/1999 |
| JP | 2001155934 A | * | 6/2001 |

OTHER PUBLICATIONS

Machine Translation JP11069690 (1999) and JP2001155934 (2001).*

* cited by examiner

*Primary Examiner* — Tran Nguyen
*Assistant Examiner* — Jose Gonzalez Quinones
(74) *Attorney, Agent, or Firm* — Muncy, Geissler, Olds & Lowe, PLLC (57) ABSTRACT

A terminal element, a motor winding structure and a manufacturing method are disclosed. The terminal element includes a fixing portion, a positioning portion and a buffering portion. The fixing portion is disposed at one end of the terminal element and has a serrate fixing pattern. The fixing portion is connected with a connecting position of the motor winding bobbin. The positioning portion is disposed adjacent to the fixing portion and urged against the motor winding structure for positioning the fixing portion while it is connected with the connecting position. The buffering portion has a first bending and a second bending, and the first bending is connected to positioning portion. The buffering portion absorbs the force applied to the terminal element.

18 Claims, 7 Drawing Sheets

TERMINAL ELEMENT, MOTOR WINDING STRUCTURE AND METHOD FOR MANUFACTURING MOTOR WINDING STRUCTURE

CROSS REFERENCE TO RELATED APPLICATIONS

This application is a continuation in part of U.S. Ser. No. 12/109,981, filed Apr. 25, 2008 now abandoned, which claims priority under 35 U.S.C. §119(a) on Patent Application No(s). 096135409, filed in Taiwan, Republic of China on Sep. 21, 2007, the entire contents of which are hereby incorporated by reference.

BACKGROUND OF THE INVENTION

1. Field of Invention

The present invention relates to a terminal element, a motor winding structure and a manufacturing method and, in particular, to a terminal element capable of firmly connecting with a motor winding bobbin to form a motor winding structure.

2. Related Art

The connecting methods between components of an electronic device and terminals are optional depending on the materials and applications. For example, the connection of metals is usually done by soldering. The connection of plastic components is usually done by melting or via an adhesive. In addition, the connection between the plastic component and metal terminal is also common in motors and its output terminals.

Figure 1A:
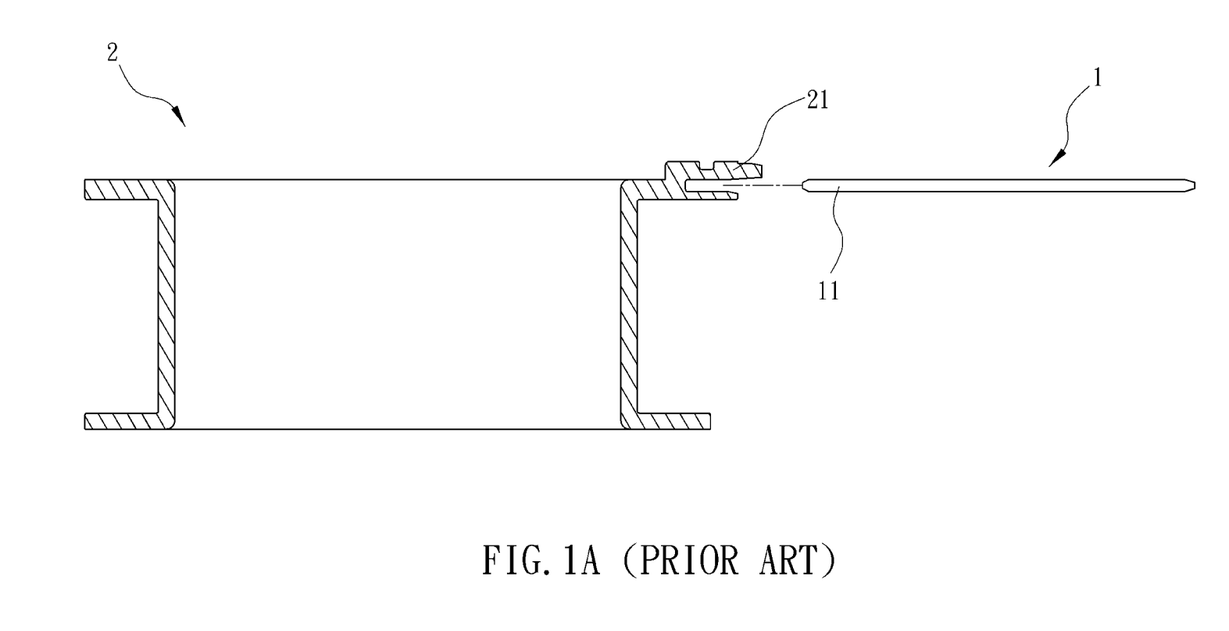
FIG. 1A is a cross-sectional view of a conventional winding bobbin and its terminal element.
Figure 1B:
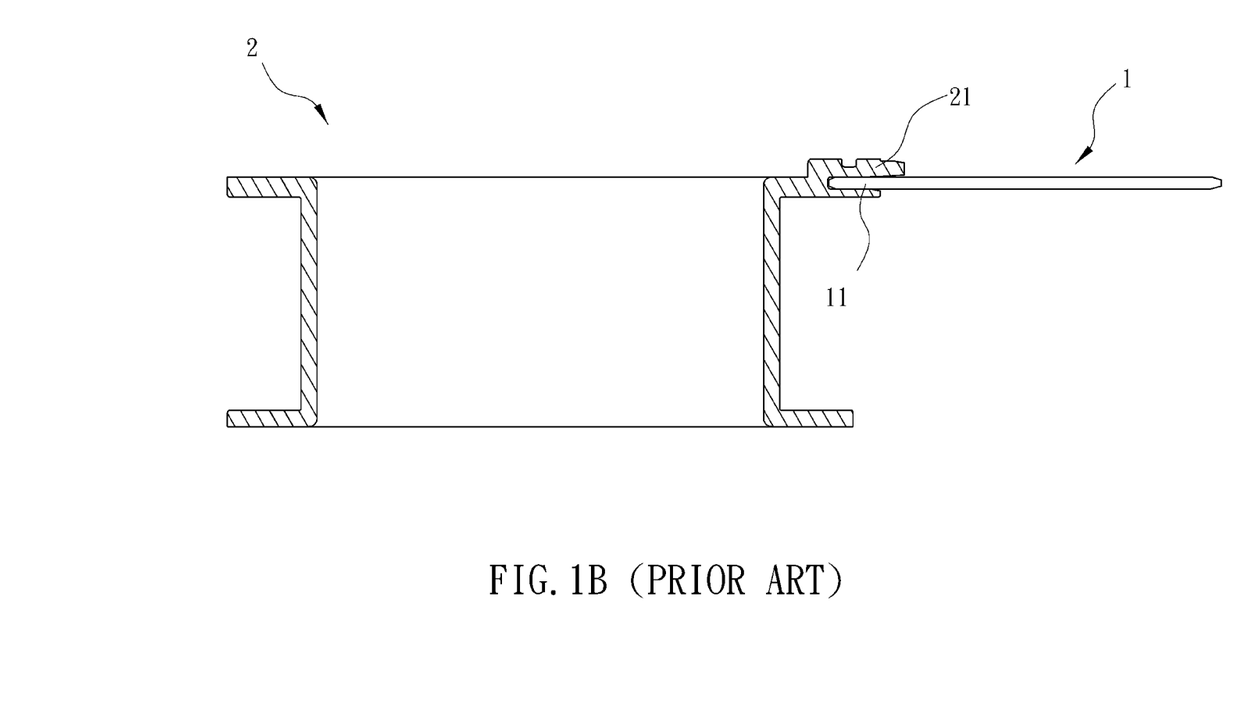
FIG. 1B is a cross-sectional view showing the terminal element in FIG. 1A is inserted into the conventional winding bobbin.

As shown in FIG. 1A and FIG. 1B, a conventional terminal element 1 is inserted to a connecting end 21 of a motor winding bobbin 2. The connecting end 21 is made by plastic, and the terminal element 1 is made by metal. The terminal element 1 has an end 11 with a round, smooth surface. The connection between the terminal element 1 and the winding bobbin 2 is done by inserting the end 11 into the connecting end 21 so as to fix the end 11 in the connecting end 21.

However, when the terminal element 1 is inserted into the connecting end 21, the precision of inserting position is completely controlled by tools or machines. Each of the terminal element 1 and the winding bobbin 2 has its material tolerance. Therefore, inserting position of the terminal element 1 into the winding bobbin 2 cannot be accurately controlled. This may result in damages to the winding bobbin 2, thereby making the terminal structure loose, increasing the production cost and reducing the product reliability. For example, when the insertion of the terminal element 1 into the winding structure 2 is not deep enough, the terminal element 1 is likely to depart from the winding structure because of insufficient support. On the other hand, if the insertion of the terminal element 1 into the winding bobbin 2 is too deep, the winding bobbin 2 may be pierced through by the terminal element 1 and thus broken, as shown in FIG. 1A.

Moreover, the winding bobbin 2 is electrically connected with an external system via the terminal element 1. Therefore, the terminal element 1 is pushed or pulled by an external force when the winding bobbin 2 is combined with or departed from the external system. Since the connection between the terminal element 1 and the winding bobbin 2 is merely a tight contact, the connecting force therebetween is fairly weak. Once the above-mentioned external force is imposed on the terminal element 1, the terminal element 1 is pushed inward to damage the winding bobbin 2 or pulled away from the winding bobbin 2.

As mentioned above, it is an important subjective to provide a terminal element, a motor winding structure and a manufacturing method for motor winding structure, which can prevent damages to the winding bobbin, and enhance connecting strength between the terminal element and the motor winding bobbin.

SUMMARY OF THE INVENTION

In view of the foregoing, the present invention is to provide a terminal element, a motor winding structure and a manufacturing method capable of increasing the connecting strength between the terminal element and a motor winding bobbin to form the motor winding structure, thereby preventing loose connections or departure, ensuring the product reliability, simplifying the man manufacturing process, and decreasing the cost.

In addition, the present invention is also to provide a terminal element that efficiently buffers improper actions imposed on the motor winding structure to ensure the product reliability.

To achieve the above, the present invention discloses a terminal element including a fixing portion, a positioning portion and a buffering portion. The fixing portion has a serrate fixing pattern and is disposed on one end of the terminal element for connecting with a connecting position of an electronic device, such as a motor winding bobbin. The positioning portion is disposed adjacent to the fixing portion to urge against the electronic device, thereby positioning the fixing portion to the connecting position of the electronic device. The buffering portion has a first bending and a second bending, and the first bending is connected to the positioning portion. The buffering portion absorbs the force applied to the terminal element.

In the terminal element of the present invention, the serrate fixing pattern is an irregular pattern. The serrate fixing pattern is formed around an axial direction of the fixing portion, or the serrate fixing pattern is formed on only one side of the fixing portion.

In addition, the present invention further discloses a motor winding structure including a motor winding bobbin, a terminal element and a welding material. The motor winding bobbin has a connecting position. The terminal element includes a fixing portion, a positioning portion and a buffering portion. The fixing portion has a serrate fixing pattern and is disposed on one end of the terminal element for connecting with a connecting position of the motor winding bobbin. The positioning portion is disposed adjacent to the fixing portion to urge against the motor winding bobbin, thereby positioning the fixing portion to a connecting position of the motor winding bobbin. The buffering portion has a first bending and a second bending, and the first bending is connected to the positioning portion. The buffering portion absorbs the force applied to the terminal element. The welding material is to cover the positioning portion and the connecting position of the motor winding bobbin.

Furthermore, the present invention further discloses a manufacturing method for a motor winding structure including a connecting process, a positioning process and a welding process. The manufacturing method of the invention includes the following steps of: inserting a fixing portion of a terminal element into a connecting position of a motor winding bobbin; urging a positioning portion of the terminal element against the motor winding bobbin, wherein a buffering portion absorbs the external force applied to the terminal element; and covering the positioning portion of the terminal element and the connecting position of the motor winding bobbin by a welding material.

As mentioned above, the terminal element of the present invention has a serrate fixing pattern that can increase the connecting force between the terminal element and the electronic device so that the terminal element cannot be easily pulled away from the electronic device. Since the terminal element of the present invention has a positioning portion, the connecting depth of the terminal element in the connecting position of the electronic device can be accurately positioned. The buffering portion of the terminal element can greatly reduce the force applying on the contact portion between the terminal element and the connecting position of the electronic device. In addition, the terminal element and the motor winding bobbin are welded together by the welding material to increase the connecting force therebetween. The above-mentioned features of the present invention can prevent damages to the electronic device, increase the stability of the system, simplify the manufacturing process, and decrease the production cost.

BRIEF DESCRIPTION OF THE DRAWINGS

The present invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
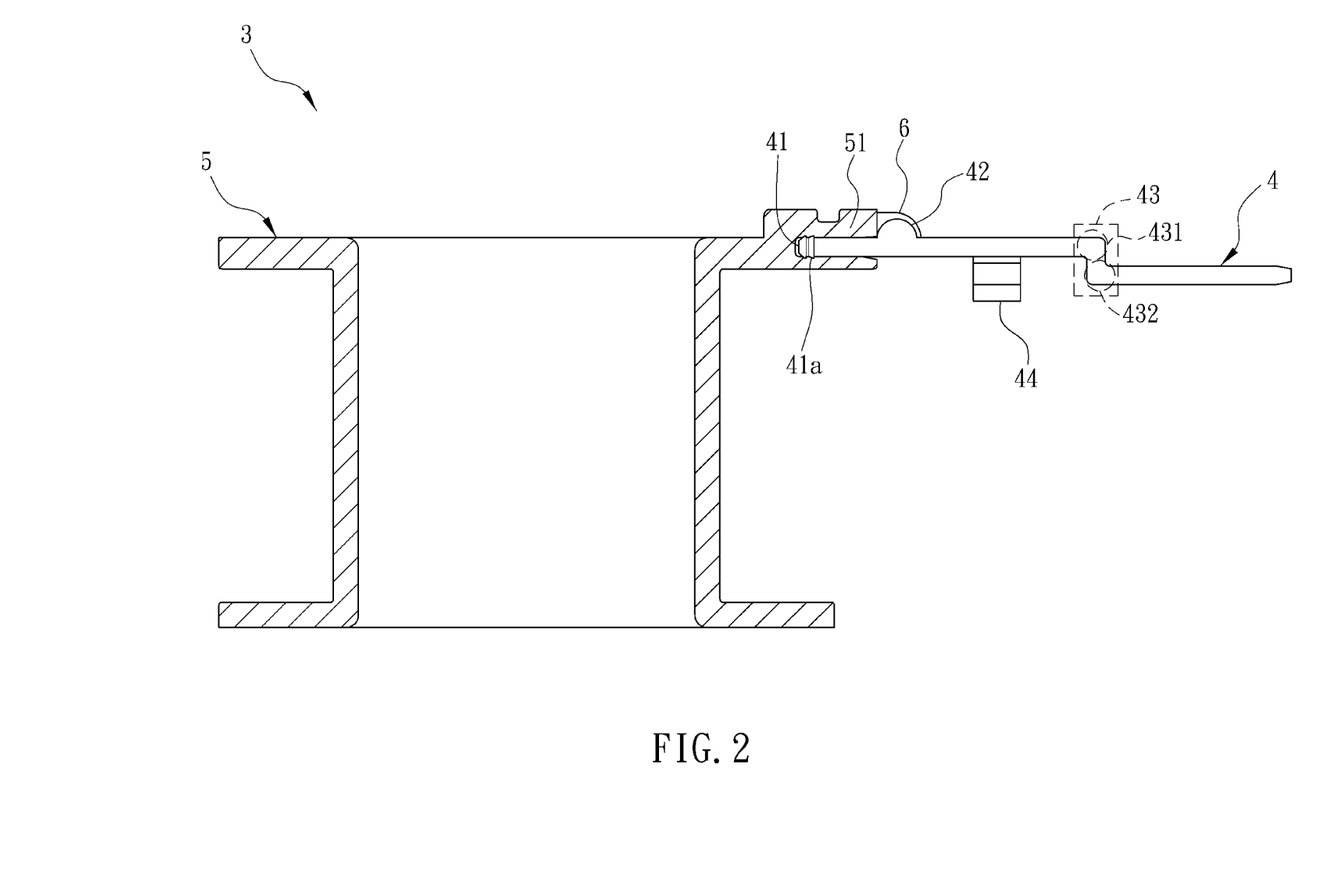
FIG. 2 is a cross-sectional view of a motor winding structure according to a preferred embodiment of the present invention.

As shown in FIG. 2, a motor winding structure 3 according to a preferred embodiment of the present invention includes a terminal element 4, an electronic device and a welding material 6.

The terminal element 4 has a fixing portion 41, a positioning portion 42 and a buffering portion 43. The terminal element 4 can be integrally formed. More explicitly, the fixing portion 41, the positioning portion 42 and the buffering portion 43 are integrally formed as a single unit. In this embodiment, the electronic device is a motor winding bobbin 5. The material of the terminal element 4 is gold, silver, copper, aluminum or any other conductive material.

The fixing portion 41 is used to connect with the connecting position 51 of the motor winding bobbin 5. The fixing portion 41 is disposed on one end of the terminal element 4 and has a serrate fixing pattern 41a. The serrate fixing pattern 41a can increase the connecting strength between the fixing portion 41 and the connecting position 51. In addition, the shape of the fixing portion 41 can be flat, conic, round or polygonal.

The serrate fixing pattern 41a can be a regular or irregular pattern. The serrate fixing pattern 41a is formed around the axial direction of the fixing portion 41 or at least one side of the fixing portion 41.

The positioning portion 42 is disposed adjacent to the fixing portion 41 to urge against the motor winding bobbin 5, thereby fixing the fixing portion 41 to the connecting position 51 of the motor winding bobbin 5. The positioning portion 42 can be a protrusion or a plurality of bendings. In this embodiment, the positioning portion 42 is a protrusion.

The buffering portion 43 has a first bending 431 and a second bending 432, and the first bending 431 is connected to the positioning portion 42.

The terminal element 4 further has at least one connecting point 44 disposed at any position thereon other than the positioning portion 42 and the fixing portion 41 for electrically connecting with a motor winding.

The welding material 6 is disposed adjacent to the positioning portion 42 and the connecting position 51 of the motor winding bobbin 5. In this embodiment, the welding material 6 covers the positioning portion 42 and the connecting position 51 of the motor winding bobbin 5 after welding.

Figure 3:
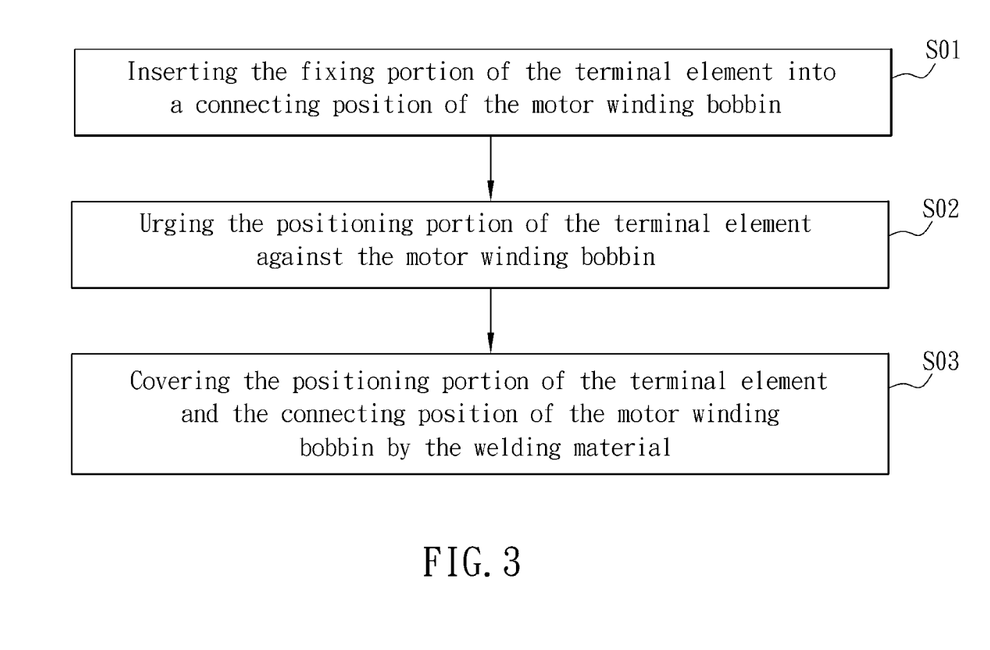
FIG. 3 is a flowchart showing the processes of a manufacturing method for a motor winding structure according to a preferred embodiment of the invention.

With reference to FIG. 3, a manufacturing method for a motor winding structure according to a preferred embodiment of the invention includes the following steps S01 to S03.

Figure 4A:
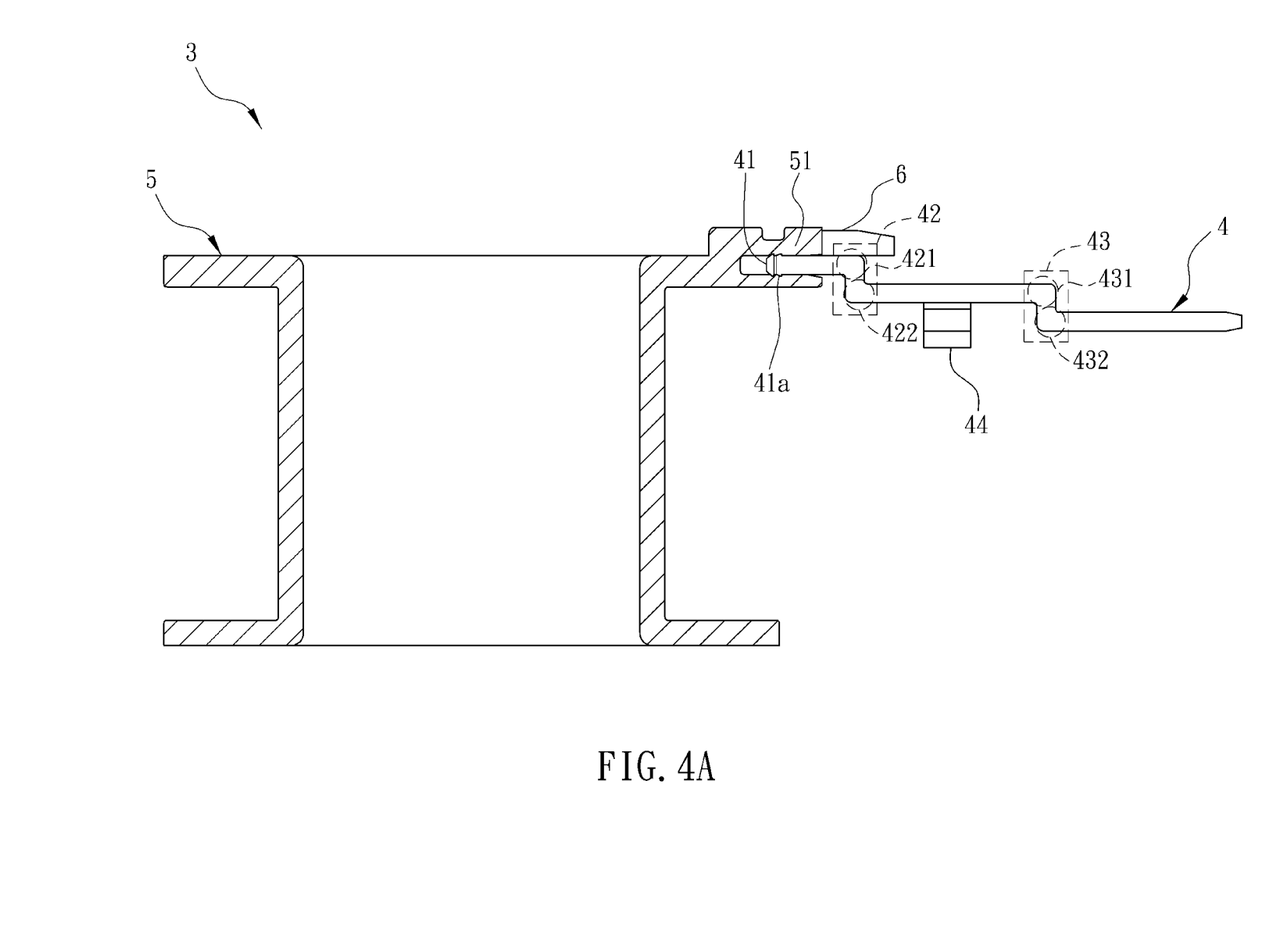
FIG. 4A is a cross-sectional view showing the terminal element in FIG. 2A is inserted into the motor winding bobbin according to a preferred embodiment of the present invention.

The step S01 is inserting the fixing portion 41 of the terminal element 4 into the connecting position 51 of the motor winding bobbin 5. As shown in FIG. 4A, when an external pulling force is imposed on the terminal element 4, the fixing portion 41 is not easily pulled away from the connecting position 51 because of the stronger connecting force therebetween due to the serrate fixing pattern 41a. Moreover, as the terminal element 4 is under this external pulling force, the buffering portion 43 absorbs most of the pulling force, so as to greatly reduce the strength of the external pulling force on the fixing portion 41. In this embodiment, the positioning portion 42 has a third bending 421 and a fourth bending 422, and the third bending 421 is connected to the fixing portion 41. The bending direction of the third bending 421 of the positioning portion 42 is different from the extending direction of the fixing portion 41.

Figure 4B:
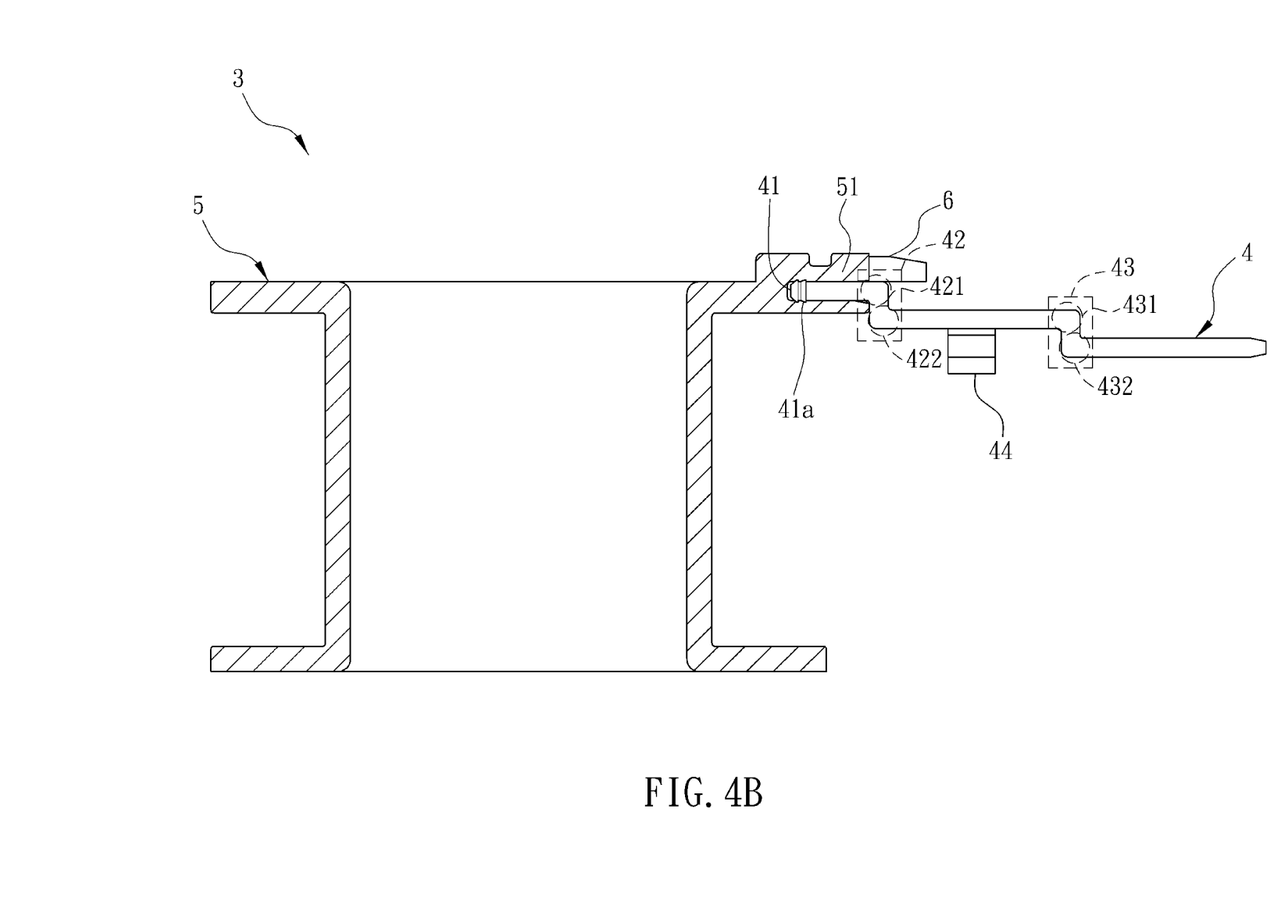
FIG. 4B is a cross-sectional view showing the terminal element in FIG. 4A is positioned by a positioning portion according to a preferred embodiment of the present invention.

The step S02 is urging the positioning portion 42 of the terminal element 4 against the motor winding bobbin 5. Please referring FIG. 4B, the positioning portion 42 prevents the terminal element 4 from further inserting into the connecting position 51. Therefore, it can effectively avoid damages of the terminal element 4 on the connecting position 51, and positions the terminal element 4 in the motor winding bobbin 5 precisely. As the terminal element 4 receives the inward pushing force, the positioning portion 42 and/or buffering portion 43 absorbs most of the force, so as to greatly reduce the strength of the pushing force on the terminal element 4.

Figure 4C:
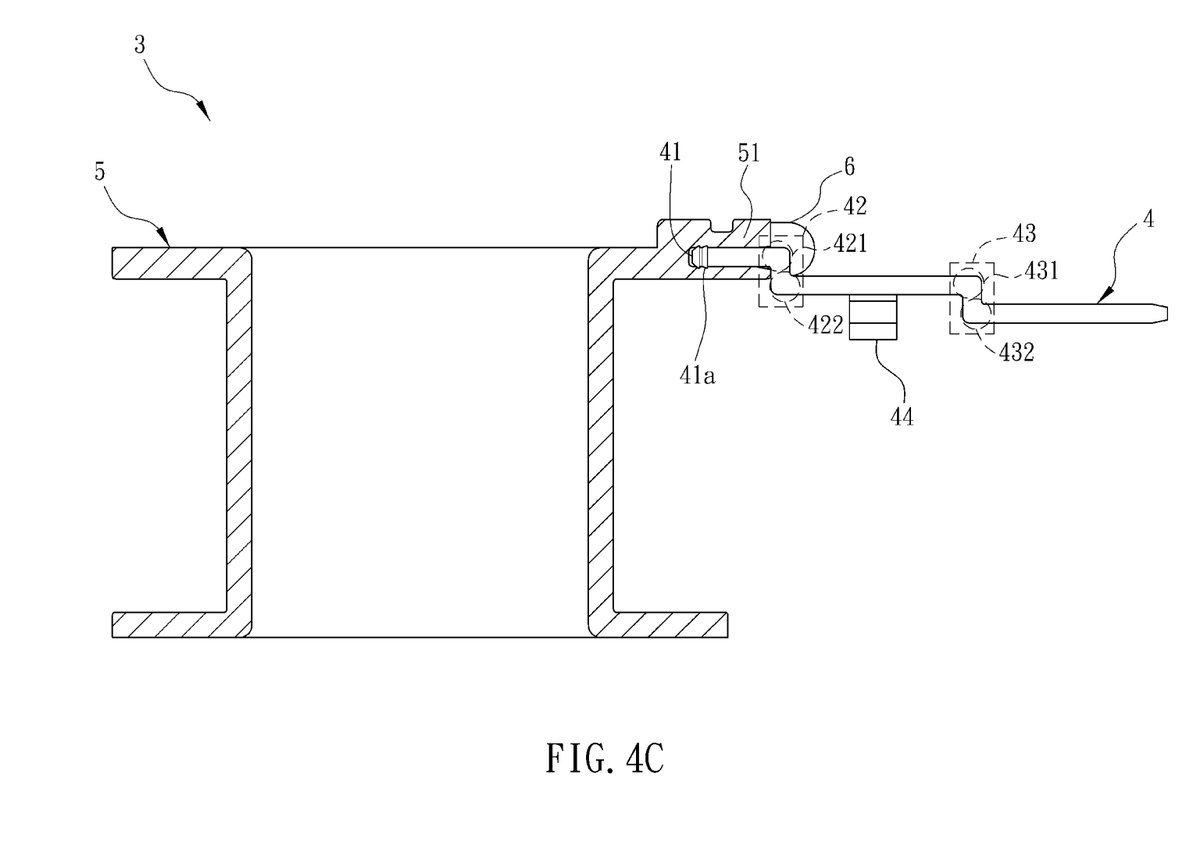
FIG. 4C is a cross-sectional view showing the terminal element and the motor winding bobbin in FIG. 4B are covered by the welding material according to a preferred embodiment of the present invention.

The step S03 is covering the positioning portion 42 of the terminal element 4 and the connecting position 51 of the motor winding bobbin 5 by the welding material 6. As shown in FIG. 4C, the welding material 6 increases the connecting force between the terminal element 4 and the motor winding bobbin 5.

As mentioned above, the terminal element of the present invention has a serrate fixing pattern that can increase the connecting force between the terminal element and the electronic device so that the terminal element cannot be easily pulled away from the electronic device. Since the terminal element of the present invention has a positioning portion, the connecting depth of the terminal element in the connecting position of the electronic device can be accurately positioned. The buffering portion of the terminal element can greatly reduce the force applying on the contact portion between the terminal element and the connecting position of the electronic device. In addition, the terminal element and the motor winding bobbin are welded together by the welding material to increase the connecting force therebetween. The above-mentioned features of the present invention can prevent damages to the electronic device, increase the stability of the system, simplify the manufacturing process, and decrease the production cost.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A terminal element, comprising:
    a fixing portion having a serrate fixing pattern and disposed on one end of the terminal element for connecting with a connecting position of an electronic device;
    a positioning portion disposed adjacent to the fixing portion to urge against the electronic device, thereby positioning the fixing portion to the connecting position of the electronic device; and
    a buffering portion having a first bending and a second bending,
    wherein the first bending is connected to positioning portion wherein the buffering portion absorbs the force applied to the terminal element,
    wherein the positioning portion comprises a third bending and a fourth bending, and a bending direction of the third bending is same as a bending direction of the first bending, and a bending direction of the fourth bending is same as a bending direction of the second bending.

2. The terminal element of claim 1, wherein a shape of the fixing portion is flat, conic, round or polygonal.

3. The terminal element of claim 1, wherein the fixing portion and the positioning portion are integrally formed as a single unit.

4. The terminal element of claim 1, wherein the serrate fixing pattern is an irregular pattern.

5. The terminal element of claim 4, wherein the serrate fixing pattern is formed around an axial direction of the fixing portion, or the fixing pattern is formed on only one side of the fixing portion.

6. The terminal element of claim 1, wherein the positioning portion is a protrusion.

7. The terminal element of claim 1, wherein the bending direction of the third bending is different from an extending direction of the fixing portion.

8. The terminal element of claim 1, wherein the electronic device is a motor winding bobbin.

9. The terminal element of claim 8, further comprising a connecting point, disposed at any position other than the positioning portion and the fixing portion, for electrically connecting with a motor winding.

10. The terminal element of claim 1, wherein a material of the terminal element comprises gold, silver, cooper, aluminum, metal or any other conductive materials.

11. A motor winding structure, comprising:
    a motor winding bobbin having a connecting position;
    a terminal element having a fixing portion, a positioning portion and a buffering portion; and
    a welding material,
    wherein the fixing portion has a serrate fixing pattern and is disposed on one end of the terminal element for connecting with the connecting position of the motor winding bobbin;
    wherein the positioning portion is disposed adjacent to the fixing portion to urge against the motor winding bobbin, thereby positioning the fixing portion to the connecting position of the motor winding bobbin;
    wherein the buffering portion has a first bending and a second bending, the first bending is connected to the positioning portion; wherein the buffering portion absorbs the force applied to the terminal element;
    wherein the welding material is covered the positioning portion and the connecting position of the motor winding bobbin,
    wherein the positioning portion comprises a third bending and a fourth bending, and a bending direction of the third bending is same as a bending direction of the first bending, and a bending direction of the fourth bending is same as a bending direction of the second bending.

12. The motor winding structure of claim 11, wherein a shape of the fixing portion is flat, conic, round or polygonal.

13. The motor winding structure of claim 11, wherein the serrate fixing pattern is an irregular pattern.

14. The motor winding structure of claim 13, wherein the serrate fixing pattern is formed around an axial direction of the fixing portion, or the fixing pattern is formed on only one side of the fixing portion.

15. The motor winding structure of claim 11, wherein the bending direction of the first bending is different from an extending direction of the fixing portion.

16. The motor winding structure of claim 11, wherein the positioning portion comprises a third bending and a fourth bending, and a bending direction of third bending is different from an extending direction of the fixing portion.

17. The motor winding structure of claim 11, wherein the terminal element further includes a connecting point, disposed at any position other than the positioning portion and the fixing portion, for electrically connecting with a motor winding.

18. A manufacturing method for a motor winding structure, wherein the motor winding structure has a motor winding bobbin, a terminal element and a welding material, the terminal element has a fixing portion, a positioning portion and a buffering portion, the buffering portion has a first bending and a second bending, the positioning portion has a third bending and a fourth bending, the manufacturing method comprising the steps of:
    inserting the fixing portion of the terminal element into a connecting position of the motor winding bobbin;
    urging the positioning portion of the terminal element against the motor winding bobbin, wherein the buffering portion absorbs the external force applied to the terminal element; and covering the positioning portion of the terminal element and the connecting position of the motor winding bobbin by the welding material,
wherein a bending direction of the third bending is same as a bending direction of the first bending, and a bending direction of the fourth bending is same as a bending direction of the second bending.

* * * * *